United States Patent
Hong

(10) Patent No.: US 9,246,139 B2
(45) Date of Patent: Jan. 26, 2016

(54) POUCH CASE FOR SECONDARY BATTERY AND SECONDARY BATTERY USING THE SAME

(75) Inventor: Sung-Ho Hong, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1003 days.

(21) Appl. No.: 13/323,193

(22) Filed: Dec. 12, 2011

(65) Prior Publication Data

US 2012/0156526 A1 Jun. 21, 2012

(30) Foreign Application Priority Data

Dec. 16, 2010 (KR) .......................... 10-2010-0129281

(51) Int. Cl.
*H01M 2/02* (2006.01)
*H01M 2/06* (2006.01)
*H01M 2/08* (2006.01)
*H01M 10/42* (2006.01)

(52) U.S. Cl.
CPC ............ *H01M 2/0212* (2013.01); *H01M 2/021* (2013.01); *H01M 2/0267* (2013.01); *H01M 2/0275* (2013.01); *H01M 2/0277* (2013.01); *H01M 2/0285* (2013.01); *H01M 2/0287* (2013.01); *H01M 2/06* (2013.01); *H01M 2/08* (2013.01); *H01M 10/425* (2013.01); *H01M 2200/00* (2013.01)

(58) Field of Classification Search
CPC . H01M 2/021; H01M 2/0212; H01M 2/0267; H01M 2/0275; H01M 2/0277; H01M 2/0285; H01M 2/0287; H01M 2/06; H01M 2/08; H01M 10/425; H01M 2200/00; B32B 15/08; B32B 15/088; B32B 15/085; B32B 15/09; B32B 15/20
See application file for complete search history.

(56) References Cited

U.S. PATENT DOCUMENTS

| 2008/0113166 A1* | 5/2008 | Kolmorgen et al. | ......... 428/212 |
| 2013/0004835 A1* | 1/2013 | Roy | .............................. 429/185 |

FOREIGN PATENT DOCUMENTS

| JP | 11-288737 | 10/1999 |
| JP | 2001-250516 | 9/2001 |
| JP | 2004-087239 | 3/2004 |
| KR | 2008-0005627 A | 1/2008 |
| KR | 1020100016719 | 2/2010 |
| KR | 10-2010-0099538 | 9/2010 |

* cited by examiner

*Primary Examiner* — Eugenia Wang
(74) *Attorney, Agent, or Firm* — Knobbe Martens Olson & Bear LLP

(57) ABSTRACT

A pouch case for a secondary battery in which the width of a metal layer in a plurality of layers to constitute the pouch case is formed narrower than those of other layers so that the metal layer is not exposed to an outer surface of the pouch case. A secondary battery includes an electrode assembly provided with one or more electrode tabs. A pouch case has the electrode assembly accommodated therein, and is formed of a plurality of layers. In the secondary battery, any one of the plurality of layers to constitute the pouch case is formed as a metal layer of which width is narrower than those of the other layers.

15 Claims, 6 Drawing Sheets

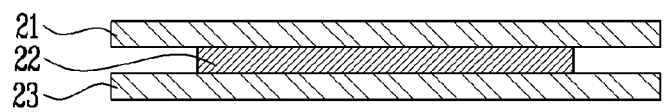
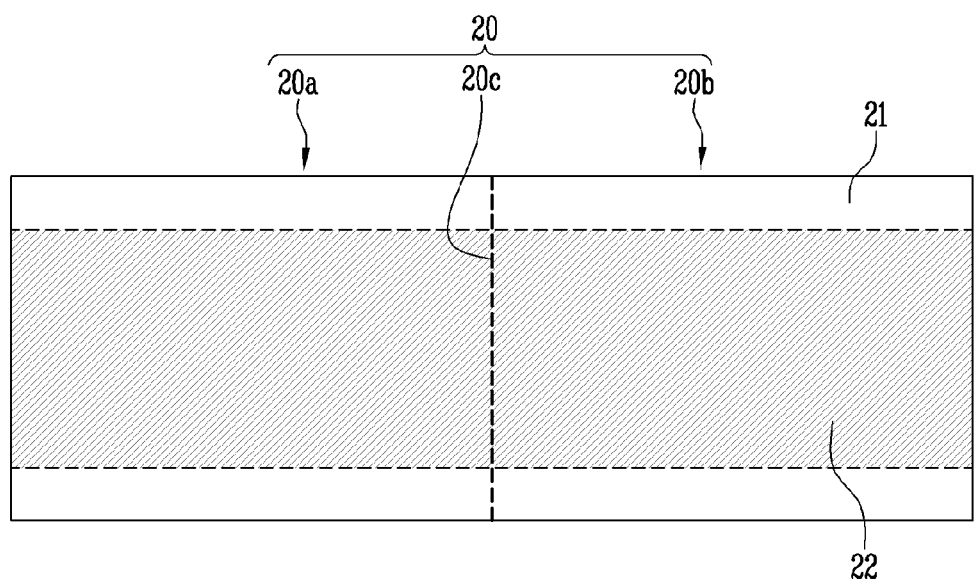
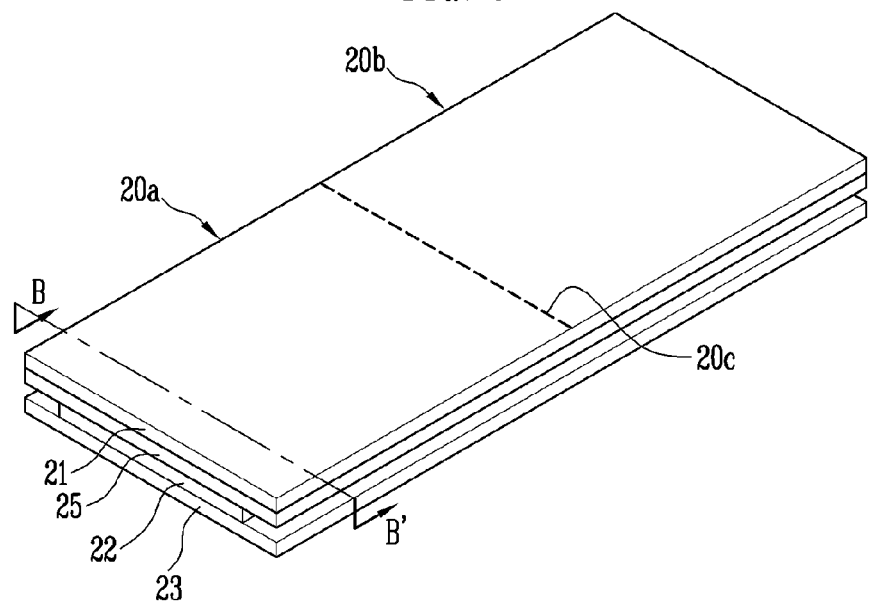

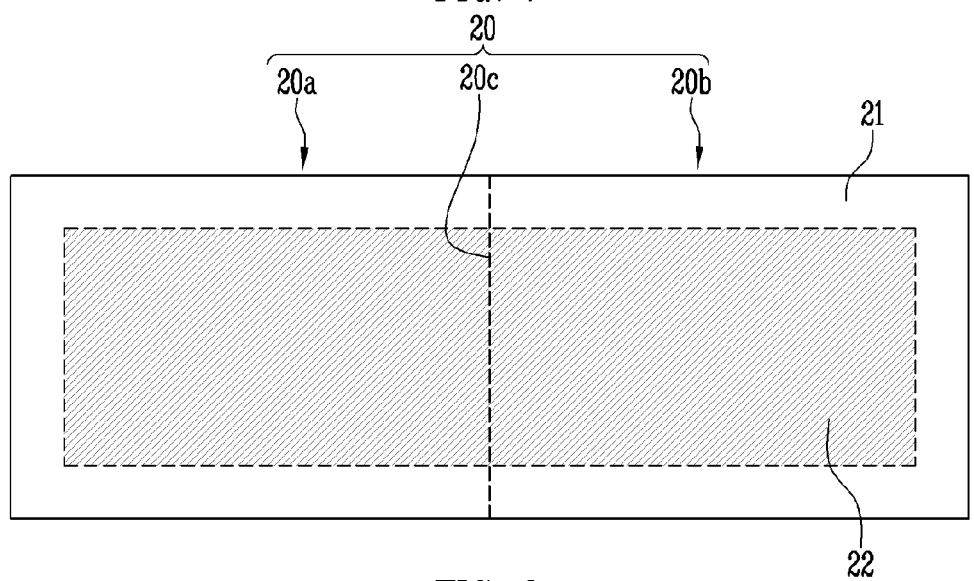
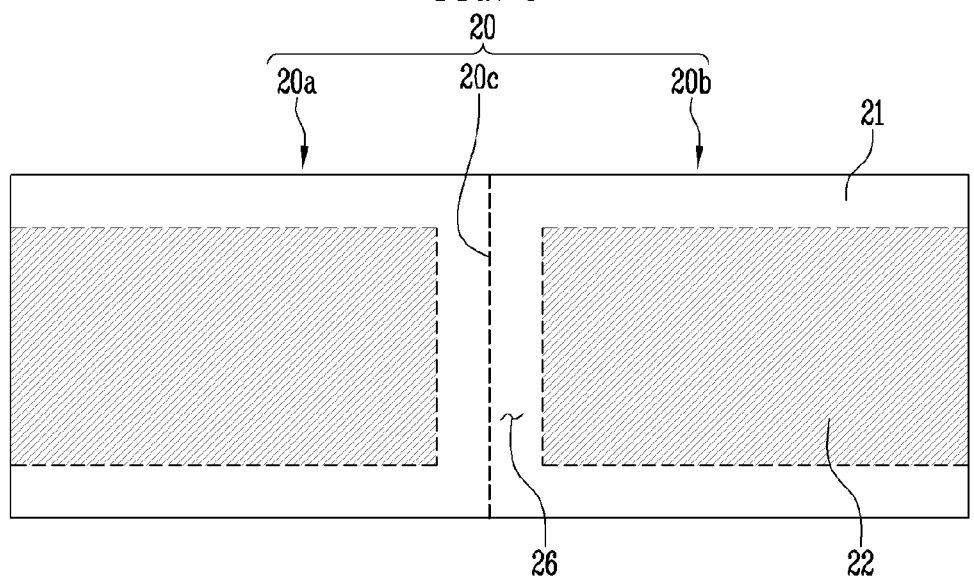

POUCH CASE FOR SECONDARY BATTERY AND SECONDARY BATTERY USING THE SAME

CROSS-REFERENCE TO RELATED APPLICATIONS

This application claims priority to and the benefit of Korean Patent Application No. 10-2010-0129281, filed on Dec. 16, 2010, in the Korean Intellectual Property Office, the entire content of which is incorporated herein by reference.

BACKGROUND

1. Field

An aspect of the present invention relates to a pouch case for a secondary battery and a secondary battery using the same, and more particularly, to a pouch case for a secondary battery and a secondary battery using the same capable of improving productivity.

2. Description of the Related Art

In general, a secondary battery has an electrode assembly accommodated in the interior of a case, and the case is formed in various shapes. For example, the case may be formed in a prismatic shape, a cylindrical shape, a pouch shape, and the like. Among these cases, a pouch case is formed of a plurality of layers including a metal layer. In this instance, a metal layer may be exposed to an outer surface of the pouch case in a sealed state after an electrode assembly is accommodated in the interior of the pouch case.

Therefore, a short circuit may be caused by the metal layer exposed to the outer surface of the pouch case contacting an outer casing of a battery pack during the manufacture of the battery pack.

SUMMARY

Embodiments provide a pouch case for a secondary battery and a secondary battery using the same, in which the width of a metal layer in a plurality of layers that constitute the pouch case is formed narrower than those of other layers so that the metal layer is not exposed to an outer surface of the pouch case, thereby omitting a separate insulation treatment process.

According to an aspect of the present invention, there is provided a secondary battery including: an electrode assembly provided with one or more electrode tabs; and a pouch case having the electrode assembly accommodated therein, the pouch case being formed of a plurality of layers, wherein any one of the plurality of layers that constitute the pouch case is formed as a metal layer of which width is narrower than those of the other layers.

The plurality of layers of the pouch case may further include an internal insulating layer and an external insulating layer, between which the metal layer is interposed.

An adhesive layer may be further formed between the metal layer and the internal insulating layer or between the metal layer and the external insulating layer.

The internal and external insulating layers may include polymer resin.

The polymer resin may include any one selected from the group consisting of nylon, polypropylene, polyimide, polyethylene terephthalate and polyethylene.

The metal layer may include aluminum (Al).

The pouch case may be provided with an electrode-tab exposure portion through which portions of the one or more electrode tabs are exposed to the exterior of the pouch case and a sealing portion formed along an outer circumference of the pouch case on both edge portions of the electrode-tab exposure portion.

The width of the metal layer may be formed narrow in the length direction of both edge portions along both the edge portions of the pouch case.

The metal layer may be formed in an inside of the sealing portion of the pouch case so that the width of the metal layer is formed narrower than those of the other layers along the outer circumference of the pouch case.

The metal layer may be formed so as not to be overlapped with the sealing portion of the pouch case.

A folding portion to fold the pouch case may be formed in a region of the pouch case, positioned at the opposite side of the electrode-tab exposure portion, and the metal layer may not be formed on the folding portion.

A protection circuit module may be mounted on an outer surface of the sealing portion formed on the electrode-tab exposure portion.

An insulating sheet including a double-faced tape may be provided between the sealing portion and the protection circuit module.

The insulating sheet may be extended up to the electrode-tab exposure portion.

According to an aspect of the present invention, there is provided a pouch case for a secondary battery to accommodate an electrode provided with one or more electrode tabs, the pouch case including an internal insulating layer, a metal layer and an external insulating layer, wherein the width of the metal layer is formed narrower than those of the internal and external insulating layers, and interposed between the internal and external insulating layers.

As described above, according to embodiments of the present invention, a separate insulation treatment process performed on an outer surface of a pouch case is omitted, so that it is possible to reduce cost of a material subjected to the insulating treatment and to improve productivity by simplifying a manufacturing process.

BRIEF DESCRIPTION OF THE DRAWINGS

The accompanying drawings, together with the specification, illustrate exemplary embodiments of the present invention, and, together with the description, serve to explain the principles of the present invention.

FIG. 3 is a sectional view taken along line A-A' of FIG. 2.

FIG. 4 is a top plan view of FIG. 2.

FIG. 5 is a perspective view showing a multi-layered structure of a pouch case according to another embodiment of the present invention.

FIG. 6 is a sectional view taken along line B-B' of FIG. 5.

FIG. 7 is a top plan view of FIG. 6.

FIG. 8 is a top plan view showing a multi-layered structure of a pouch case according to still another embodiment of the present invention.

DETAILED DESCRIPTION

Figure 1:
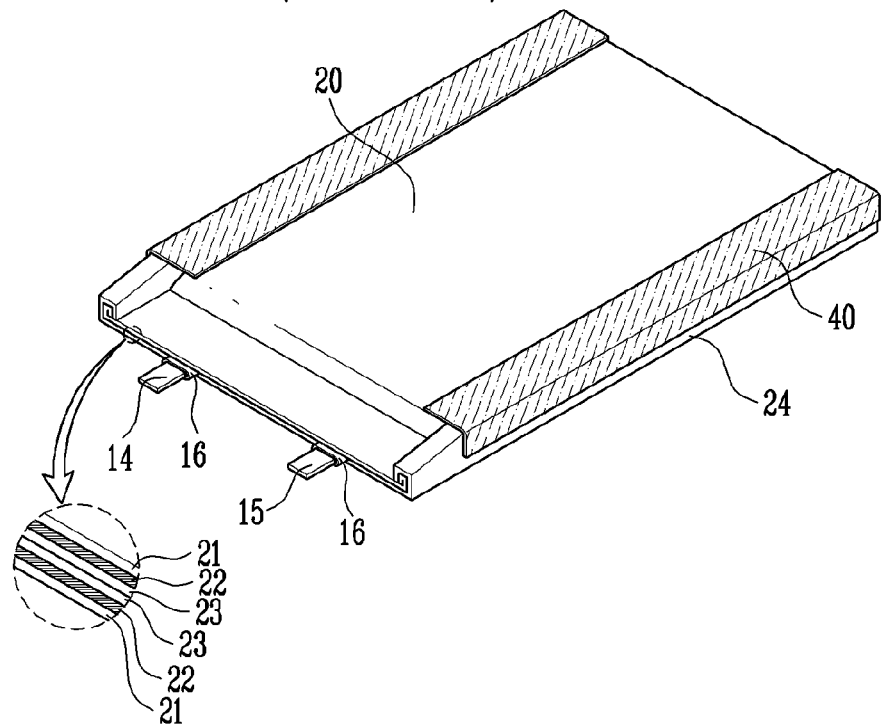
FIG. 1 is a perspective view showing a general secondary battery.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

FIG. 1 is a perspective view showing a general secondary battery.

Referring to FIG. 1, a general polymer battery includes an electrode assembly (not shown) and a pouch case 20 to accommodate the electrode assembly. The pouch case 20 may be generally formed into a multi-layered structure including a metal layer. In this instance, a metal layer 22 may be exposed along an outer circumference of the pouch case 20 that is sealed after the electrode assembly is accommodated in the pouch case 20. As shown, portions of electrode tabs 14 and 15 are exposed to the exterior of the pouch case 20. Reference numeral 16 denotes an insulating tape, which will be described in detail with reference to FIG. 9.

Since the metal layer 22 is interposed between an external insulating layer 21 and an internal insulating layer 23 in the pouch case 20, the metal layer may be exposed along the outer circumference of the pouch case 20. Therefore, in the manufacture of a battery pack, the metal layer 22 exposed along the outer circumference of the pouch case 20 may cause a short circuit with an outer casing of the battery pack.

In order to prevent the short circuit, an insulating member 40 is attached to the exposed part of the metal layer 22, so that the metal layer 22 cannot be exposed along the outer circumference of the pouch case 20. However, a polyimide tape is used as the insulating member 40, and therefore, material cost is increased. In addition, a process of attaching the insulating member 40 is added to the manufacture of the battery pack, which reduces the productivity of the manufacturing process.

Accordingly, in the secondary battery, a plan is required to address problems of the increase of material cost and the deterioration of productivity.

Figure 2:
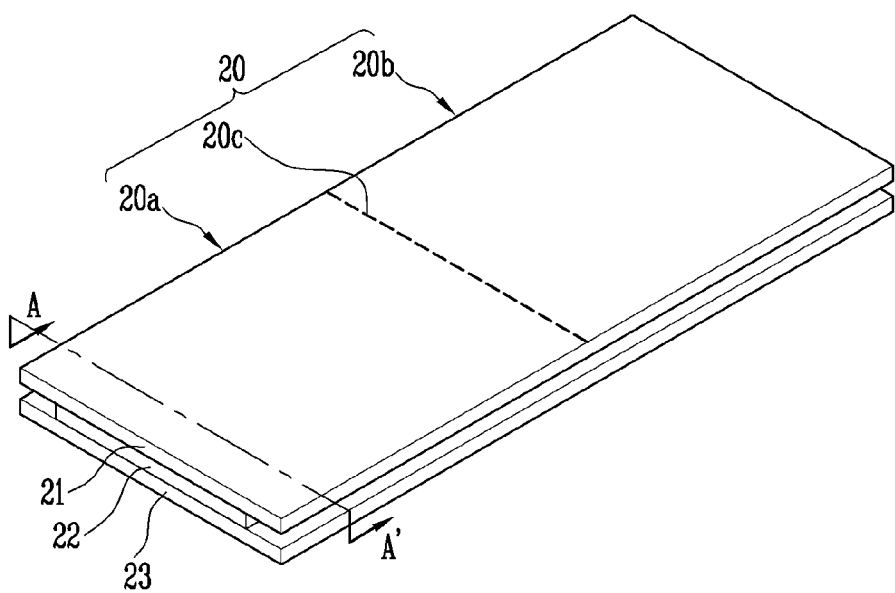
FIG. 2 is a perspective view showing a multi-layered structure of a pouch case according to an embodiment of the present invention.

FIG. 2 is a perspective view showing a multi-layered structure of a pouch case according to an embodiment of the present invention. FIG. 3 is a sectional view taken along line A-A' of FIG. 2.

Referring to FIGS. 2 and 3, the pouch case 20 according to this embodiment is formed of a plurality of layers. Any one of the plurality of layers to constitute the pouch case 20 is formed as a metal layer 22, and the metal layer is formed narrower than other layers. A folding portion 20c is formed at the center of the length direction of the pouch case 20, and the pouch case 20 may be folded by the folding portion 20c so that first and second areas 20a and 20b are overlapped with each other.

Here, the plurality of layers of the pouch case 20 may further include an external insulating layer 21 and an internal insulating layer 23 between which the metal layer 22 is interposed. The external and internal insulating layers 21 and 23 may include polymer resin. For example, the polymer resin may include any one selected from the group consisting of nylon, polypropylene, polyimide, polyethylene terephthalate and polyethylene.

Among these insulating layers, the external insulating layer 21 functions to protect the battery from external environment, and requires an excellent tensile strength and weather resistance with respect to thickness, and the like. The metal layer 22 may include aluminum (Al).

The width of the metal layer 22 may be formed narrower than that of the external or internal insulating layer 21 or 23 at both edge portions vertical to the folding portion 20c of the pouch case 20. That is, the metal layer 22 is formed more inward than the external or internal insulating layer 21 or 23 so as not to be exposed along outer circumferences at both the edge portions of the pouch case 20.

Referring to FIG. 4, the pouch case 20 is divided into the first and second areas 20a and 20b with respect to the folding portion 20c formed at a central portion of the pouch case 20, which is vertical to the length direction of the pouch case 20. As described above, the pouch case may have a structure in which the external insulating layer 21, the metal layer 22 and the internal layer 23 are stacked (see FIG. 2).

If the pouch case 20 is viewed from the top thereof, the width of the metal layer 22 may be formed narrower than that of the external or internal insulating layer 21 or 23 along both the edge portions. Accordingly, the metal layer 22 cannot be exposed along the outer circumferences of both the edge portions of the pouch case 20.

In the following drawings, descriptions of components identical to those of FIGS. 2 to 4 will be omitted.

FIG. 5 is a perspective view showing a multi-layered structure of a pouch case according to another embodiment of the present invention. FIG. 6 is a sectional view taken along line B-B' of FIG. 5.

Referring to FIGS. 5 and 6, the pouch case 20 according to this embodiment includes an external insulating layer 21, a metal layer 22, an internal insulating layer 23 and an adhesive layer 25. Here, the adhesive layer 25 is made of a polymer resin and is positioned between the metal layer 22 and the external insulating layer 21, and may be formed to increase the adhesion between the metal layer 22 and the external insulating layer 21. Although not shown in these figures, the adhesive layer 25 may be formed between the metal layer 22 and the internal insulating layer 23 so as to increase the adhesion between the metal layer 22 and the internal insulating layer 23.

A folding portion 20c is formed at the center of the length direction of the pouch case 20, and the pouch case 20 may be folded by the folding portion 20c so that first and second areas 20a and 20b are overlapped with each other. In this instance, the metal layer 22 may be formed narrower than other layers.

More specifically, in edge portions except the folding portion 20c of the pouch case 20, the width of the metal layer 22 may be formed narrower than that of the external or internal insulating layer 21 or 23. That is, the metal layer 22 is formed more inward than the external or internal insulating layer 21 or 23 so as not to be exposed along the outer circumference of the pouch case 20.

FIG. 7 is a top plan view of FIG. 6.

Referring to FIG. 7, the pouch case 20 is divided into the first and second areas 20a and 20b with respect to the folding portion 20c formed at a central portion of the pouch case 20, which is vertical to the length direction of the pouch case 20. As described above, the pouch case may have a structure in which the external insulating layer 21, the metal layer 22 and the internal layer 23 are stacked (see FIG. 5).

If the pouch case 20 is viewed from the top thereof, width of the metal layer 22 may be formed narrower than that of the external or internal insulating layer 21 or 23 along the edge portions except the folding portion 20c of the pouch case 20. Accordingly, the metal layer 22 cannot be exposed along the outer circumference of the pouch case 20 at all.

FIG. 8 is a top plan view showing a multi-layered structure of a pouch case according to still another embodiment of the present invention.

Referring to FIG. 8, the pouch case 20 according to this embodiment is provided with a folding portion 20c formed at a central portion of the pouch case 20, which is vertical to the length of the pouch case 20. The pouch case 20 may have a structure in which an external insulating layer 21, a metal layer 22 and an internal insulating layer 23 are stacked. In this instance, the width of the metal layer 22 may be formed narrower than that of the external or internal insulating layer 21 or 23 along both edge portions of the pouch case 20. A space portion 26 at which the metal layer 22 is not formed may be further formed on the folding portion 20c.

Accordingly, the metal layer 22 cannot be exposed along outer circumferences of both the edge portions of the pouch case 20. The space portion 26 is formed, so that the thickness of the folding portion 20c is formed thinner than those of other portions when the pouch case 20 is folded after an electrode assembly (not shown) is accommodated in the interior of the pouch case 20. Thus, the pouch case 20 can be more easily folded.

Figure 9:
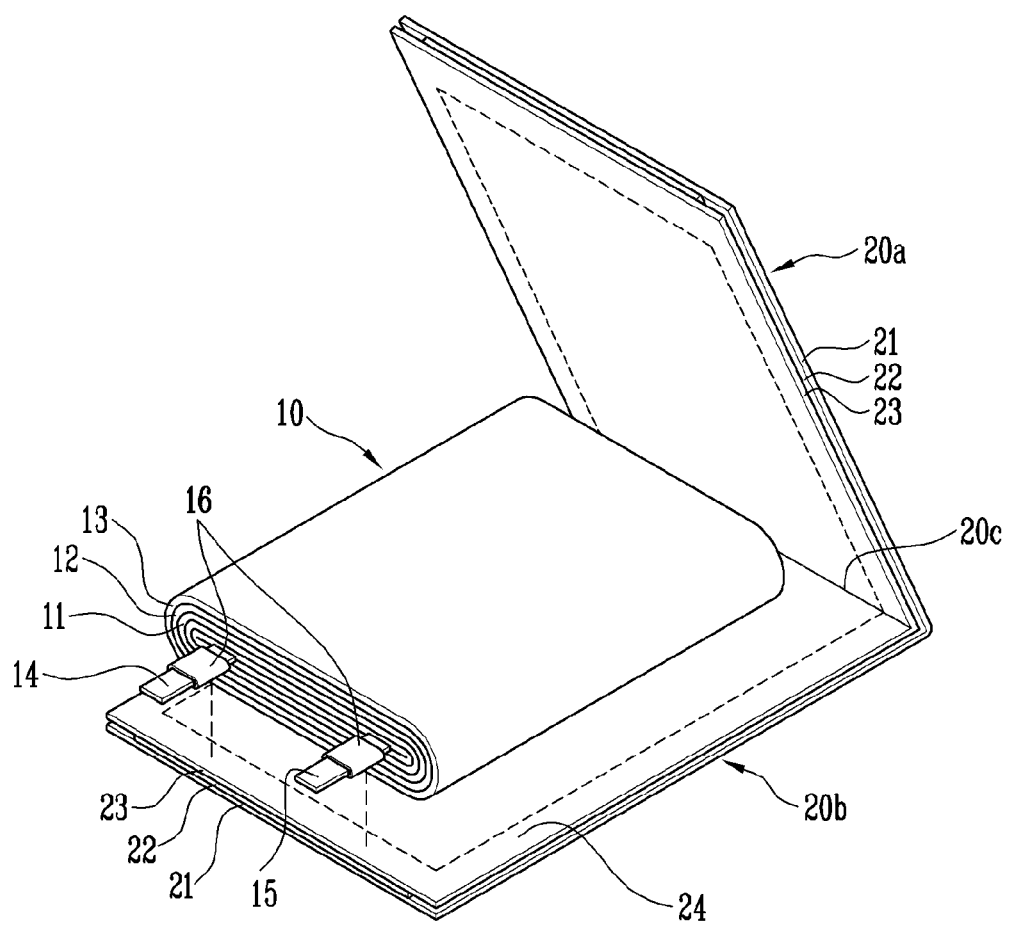
FIG. 9 is a perspective view showing a state before a pouch case is sealed according to the present invention.

FIG. 9 is a perspective view showing a state before a pouch case is sealed.

Referring to FIG. 9, in the pouch case 20 according to the present invention, an external insulating layer 21 is exposed to the exterior of the pouch case 20, and an internal insulating layer 23 is folded by a folding portion 20c. The pouch case 20 is folded by the folding portion 20c so that first and second areas 20a and 20b are overlapped with each other. In this instance, an electrode assembly 10 is positioned on the internal insulating layer in the second area 20b.

The width of a metal layer 22 may be formed narrower than that of the external or internal insulating layer 21 or 23 in the length direction along both edge portions of the pouch case 20. The pouch case 20 may be provided with an electrode-tab exposure portion through which portions of electrode tabs 14 and 15 are exposed to the exterior of the pouch case 20 and a sealing portion 24 formed along the outer circumference of the pouch case 20 on both edge portions of the electrode-tab exposure portion.

The electrode assembly 10 accommodated in the interior of the pouch case 20 may be formed in a jelly-roll shape by winding a positive electrode plate 11, a negative electrode plate 12 and a separator 13 interposed therebetween. The electrode tabs 14 and 15 are extracted from the positive and negative electrode plates 11 and 12, respectively. If one electrode tab 14 has a negative polarity, the other electrode tab 15 may have a positive polarity. The negative electrode tab 14 may be formed of nickel or nickel alloy, and the positive electrode tab 15 may be formed of aluminum or aluminum alloy.

An insulating tape 16 may be further attached to each of the electrode tabs 14 and 15. The insulating tape 16 may be used to prevent short circuits between the pouch case 20 and the electrode tabs 14 and 15. The insulating tape 16 may be made of a resin material having an adhesive surface.

Figure 10:
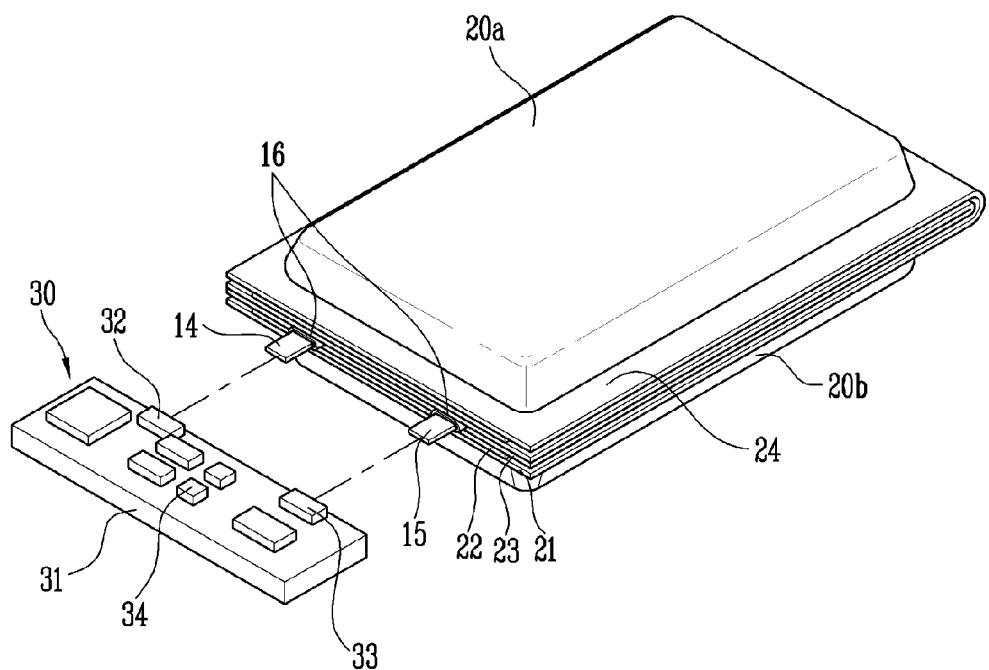
FIG. 10 is a perspective view showing a state that the pouch case is sealed according to the present invention.

FIG. 10 is a perspective view showing a state that the pouch case is sealed.

Referring to FIG. 10, the pouch case 20 having the electrode assembly 10 (see FIG. 9) accommodated therein is folded so that the first and second areas 20a and 20b are overlapped with each other with respect to the folding portion 20c. The first and second areas 20a and 20b may be thermally fused to each other by applying heat and pressure to the sealing portion 24 from the outer surface of the pouch case 20. In this instance, the insulating tape 16 may be formed at a position corresponding to the sealing portion 24 of the pouch case 20, and the electrode tabs 14 and 15 exposed to the exterior of the pouch case 20 may be electrically connected to a protection circuit module 30.

Here, the metal layer 22 may be formed so as not to be overlapped with the sealing portion 24 of the pouch case 20. That is, the difference of widths between the external or internal insulating layer 21 or 23 and the metal layer 22 may be formed identical to or wider than the width of the sealing portion 24. Accordingly, the metal layer 22 is less influenced by the heat and pressure applied to the sealing portion 24 in the sealing of the pouch case 20.

The protection circuit module 30 is provided with negative and positive electrode terminals 32 and 33 respectively connected to the electrode tabs 14 and 15. The protection circuit module 30 is formed by mounting various types of electronic components 34 on a substrate 31 having a printed circuit portion printed thereon.

Figure 11:
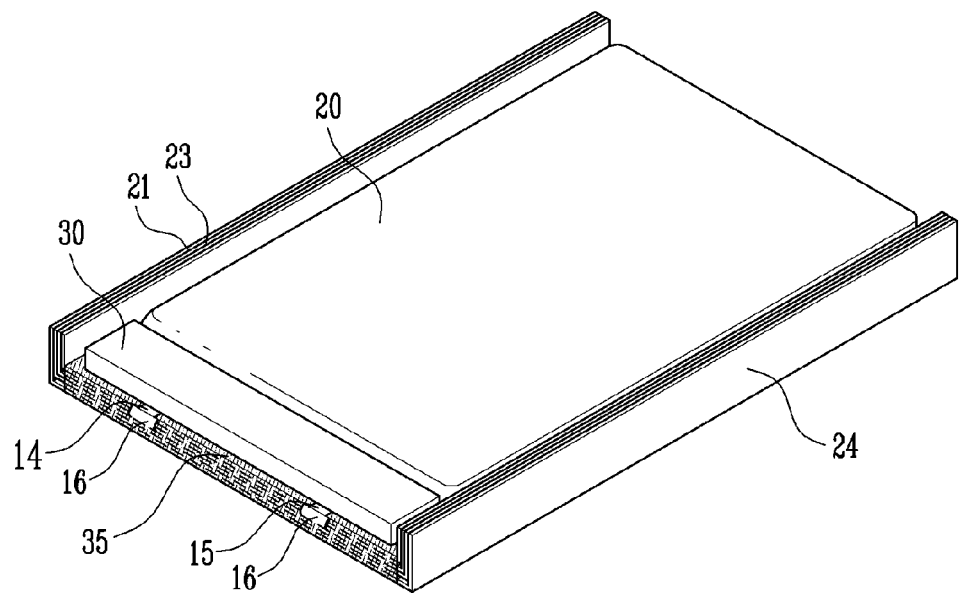
FIG. 11 is a perspective view showing a state that a protection circuit module is coupled to the pouch case according to the present invention.

FIG. 11 is a perspective view showing a state that a protection circuit module is coupled to the pouch case.

Referring to FIG. 11, the sealing portion 24 of the pouch case 20 is formed along the electrode-tab exposure portion through which the electrode tabs 14 and 15 are exposed to the exterior of the pouch case 20 and the outer circumference of the pouch case 20 on both edge portions of the electrode-tab exposure portion. Both the edge portions of the pouch case 20 may be folded toward a side of the first area 20a in a fused state.

That is, the sealing portion 24 formed along both the edge portions is folded toward a side of the pouch case 20 at least one time so as to reduce the volume of the pouch case 20 when the pouch case 20 is packaged by an outer casing of a battery pack. The sealing portion 24 may be adhered closely to the pouch case 20.

The protection circuit module 30 may be mounted on an outer surface of the sealing portion 24, formed on the electrode-tab exposure portion in the state that it is electrically connected to the electrode assembly 10 (see FIG. 9). In this instance, each of the electrode tabs 14 and 15 connected to the protection circuit module 30 may be formed in the state that one region of each of the electrode tabs 14 and 15 is bent.

An insulating sheet 35 including a double-faced tape may be provided between the protection circuit module 30 and the sealing portion 24 at the side of the exposed electrode tabs 14 and 15. The insulating sheet 35 may be extended up to the electrode-tab exposure portion. Accordingly, the metal layer 22 formed at the electrode-tab exposure portion can be insulated from the outer casing of the battery pack.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

Figure 12:
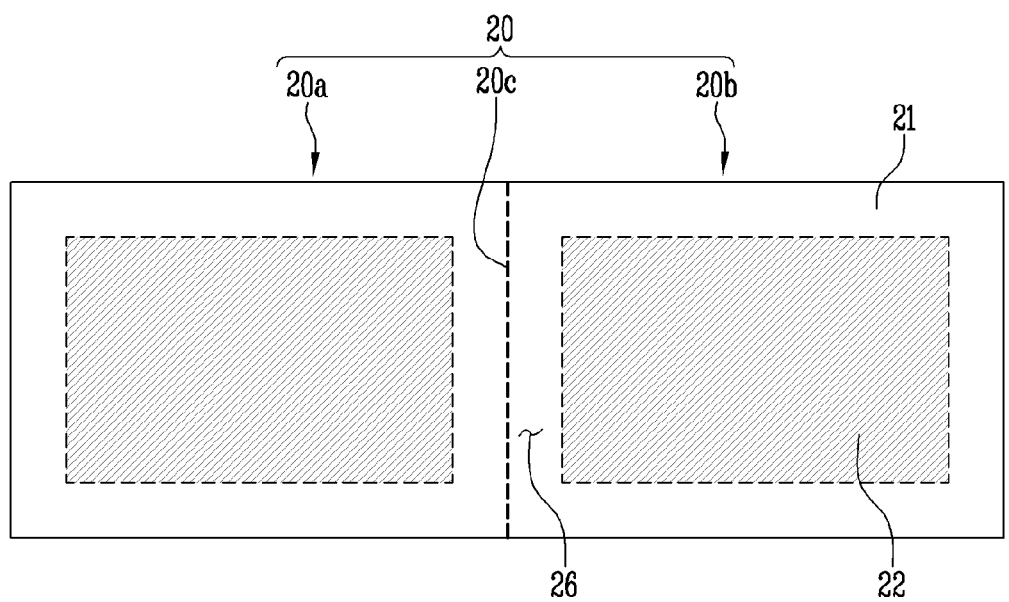
FIG. 12 is a top plan view showing a multi-layered structure of a pouch case according to still another embodiment of the invention.

FIG. 12 illustrates am embodiment where a folding portion 20c is located opposite the edges where the electrode tabs are formed (See, FIG. 11) but the metal layer 22 is not formed in the area of the folding portion 20c.

What is claimed is:

1. A secondary battery comprising:
    an electrode assembly provided with one or more electrode tabs; and
    a pouch case having the electrode assembly accommodated therein, the pouch case being formed of a plurality of layers,
    wherein any one of the plurality of layers to constitute the pouch case is formed as a metal layer of which width is narrower than those of other layers of the plurality of layers.

2. The secondary battery according to claim 1, wherein the plurality of layers of the pouch case further comprise an internal insulating layer and an external insulating layer, between which the metal layer is interposed.

3. The secondary battery according to claim 2, wherein an adhesive layer is further formed between the metal layer and the internal insulating layer or between the metal layer and the external insulating layer.

4. The secondary battery according to claim 2, wherein the internal and external insulating layers include polymer resin.

5. The secondary battery according to claim 4, wherein the polymer resin includes any one selected from the group consisting of nylon, polypropylene, polyimide, polyethylene terephthalate and polyethylene.

6. The secondary battery according to claim 1, wherein the metal layer includes aluminum (Al).

7. The secondary battery according to claim 1, wherein the pouch case is provided with an electrode-tab exposure portion through which portions of the one or more electrode tabs are exposed to the exterior of the pouch case and a sealing portion formed along an outer circumference of the pouch case on both of a first and second edge portions of the electrode-tab exposure portion.

8. The secondary battery according to claim 7, wherein the width of the metal layer is narrower along a length of both the first and second edge portions of the pouch case.

9. The secondary battery according to claim 7, wherein the metal layer is formed in an inside of the sealing portion of the pouch case so that the width of the metal layer is formed narrower than those of the other layers of the plurality of layers along the outer circumference of the pouch case.

10. The secondary battery according to claim 9, wherein the metal layer is formed so as not to be overlapped with the sealing portion of the pouch case.

11. The secondary battery according to claim 10, wherein a folding portion to fold the pouch case is formed in a region of the pouch case, positioned at an opposite side of the electrode-tab exposure portion, and the metal layer is not formed on the folding portion.

12. The secondary battery according to claim 7, wherein a protection circuit module is mounted on an outer surface of the sealing portion formed adjacent the electrode-tab exposure portion.

13. The secondary battery according to claim 12, wherein an insulating sheet including a double-faced tape is provided between the sealing portion and the protection circuit module.

14. The secondary battery according to claim 13, wherein the insulating sheet is extended up to the electrode-tab exposure portion.

15. The secondary battery according to claim 7, wherein a folding portion to fold the pouch case is formed in a region of pouch case positioned at an opposite side of the electrode-tab exposure portion, and the metal layer is not on the folding portion.

* * * * *